United States Patent [19]
Stubblefield

[11] 3,894,528
[45] July 15, 1975

[54] SOLAR ENERGY COLLECTION METHOD AND APPARATUS

[75] Inventor: Richard R. Stubblefield, Arnold, Md.

[73] Assignee: Broyles & Broyles, Inc., Fort Worth, Tex.

[22] Filed: June 25, 1974

[21] Appl. No.: 483,038

[52] U.S. Cl. .................. 126/271; 62/2; 126/270; 237/1 A; 261/111; 261/119 R; 261/148; 261/149; 261/151
[51] Int. Cl.² ............................................. F24J 3/02
[58] Field of Search ............ 126/270, 271; 237/1 A; 34/93, 72; 62/2, 119; 261/119 R, 111, 148, 149, 151

[56] References Cited
UNITED STATES PATENTS

| | | | |
|---|---|---|---|
| 991,161 | 5/1911 | McHenry | 126/271 |
| 2,221,971 | 11/1940 | Haywood | 126/271 |
| 2,342,062 | 2/1944 | Schenk | 126/271 |
| 2,636,129 | 4/1953 | Agnew | 126/271 |
| 3,372,691 | 3/1968 | Shachar | 126/271 |

*Primary Examiner*—William F. O'Dea
*Assistant Examiner*—James C. Yeung
*Attorney, Agent, or Firm*—Bacon & Thomas

[57] ABSTRACT

A dilute solution of lithium chloride having a vapor pressure greater than that of relatively dry air is exposed to sunlight to vaporize water from the solution into a body of air, this concentrates the solution and lowers its vapor pressure while increasing the vapor pressure of the air-water vapor mixture. The moist air and concentrated solution are separately conveyed to a chamber where they are mixed and the water vapor is absorbed by the concentrated solution, giving up its latent heat of vaporization, and the solution is thus diluted and heated. Heat is then removed from the solution as converted solar energy and the air and cooled dilute solution are recycled in a continuous process.

8 Claims, 1 Drawing Figure

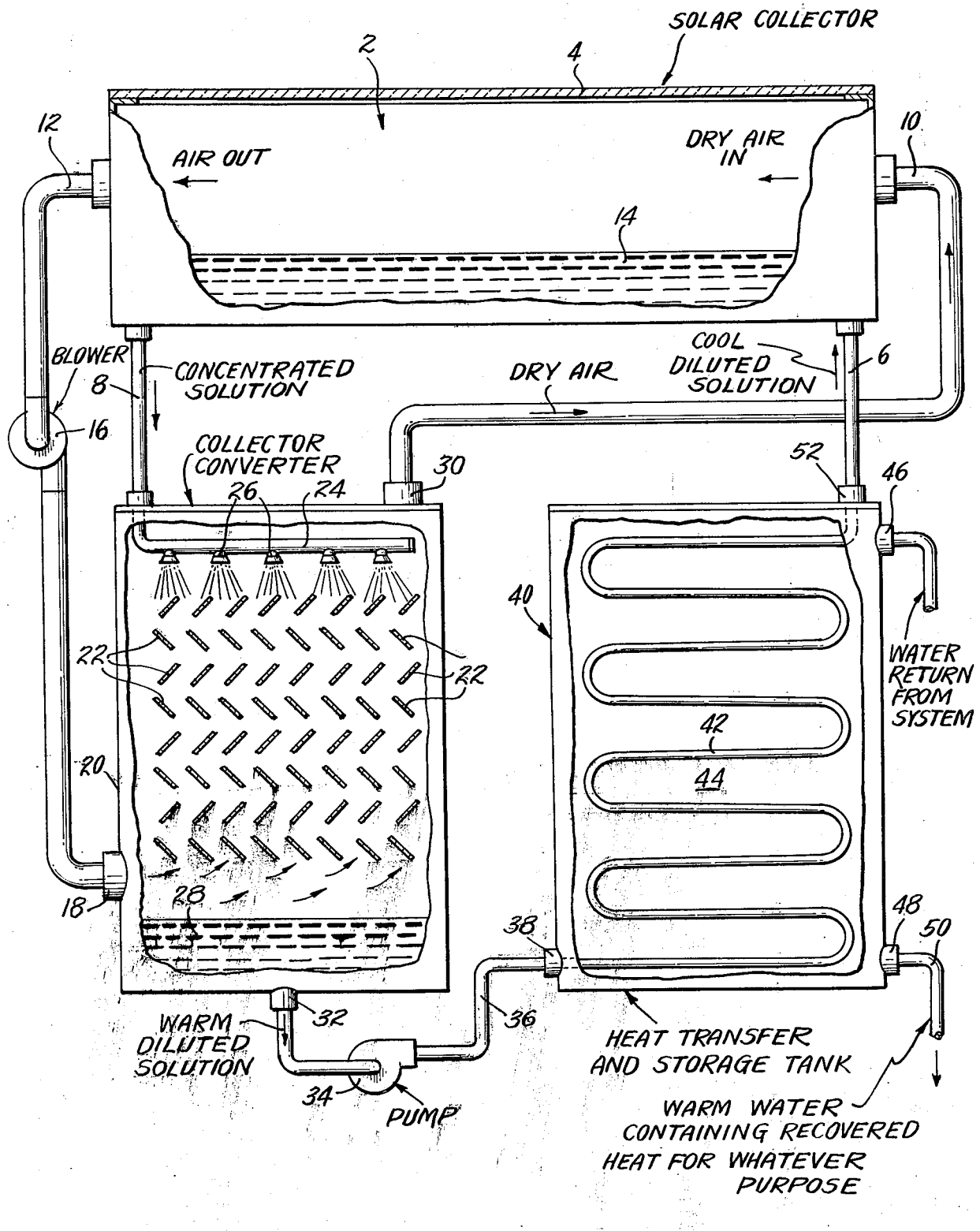

SOLAR ENERGY COLLECTION METHOD AND APPARATUS

BACKGROUND OF THE INVENTION

This invention is in the field of solar energy and relates particularly to methods and apparatus for converting and collecting solar energy in a usable form.

Many proposals have been made heretofore for collecting solar energy, but they have generally comprised exposing a liquid to sunlight to directly increase the temperature of the liquid sufficiently to be able to extract heat therefrom. It has also been proposed to operate absorption type refrigerating apparatus by employing solar energy as a heat source for separating the refrigerant from a carrier fluid. However, all such previous proposals were relatively expensive and inefficient in requiring the solar energy to directly increase the temperature of a liquid.

SUMMARY OF THE INVENTION

The present invention collects solar energy, not by causing the same to directly increase the temperature of a fluid but by employing trapped solar energy as a source of heat of vaporization without in itself substantially increasing the sensible temperature of a carrier liquid.

It is a principal object of this invention to provide a method and apparatus for capturing a portion of the sun's energy and convert it into a state suitable for beneficial use.

Another object of the present invention is to provide a highly efficient and inexpensive method and apparatus for collecting solar heat.

It is a further object of this invention to provide a method of collecting solar energy by directly converting the same to heat of vaporization of a vaporizable solvent in a carrier solution and thereafter recombining the vaporized solvent and solution to provide an increase in temperature of the solution and thus facilitate heat extraction.

BRIEF DESCRIPTION OF THE DRAWINGS

The single FIGURE of the drawings is a schematic representation of suitable apparatus for practicing the present invention.

DESCRIPTION OF A PREFERRED EMBODIMENT

The following description is directed specifically to the use of water as a vaporizable solvent, air as a carrier gas and a solution of lithium chloride as a carrier solution but it is to be understood that other materials may be employed. The salts of other metals or the like may constitute the materials in the carrier solution and liquid other than water may be employed as the solvent while gases other than air could serve as a carrier gas.

In FIG. 1, numeral 2 designates a solar collector generally in the form of a container, preferably of shallow dimension but covering a substantial horizontal area and provided with a transparent cover 4 through which sunlight may penetrate. Preferably, the bottom and side walls of the container 2 are opaque and may be provided with either heat absorbing or heat reflective inner surfaces. A conduit 6 is arranged to direct a dilute aqueous solution of lithium chloride into the bottom of container 2 adjacent one end thereof and an outlet conduit 8 is arranged to drain solution from the other end of the container 2. An inlet duct 10 is arranged to direct air into the container 2 above the bottom thereof and at the end corresponding to the inlet conduti 6. Likewise, an outlet duct 12 is arranged to receive and remove air and water vapor from the container 2 at the same end thereof as the outlet conduit 8. In operation, the level of the lithium chloride solution in container 2 will be substantially below the transparent cover 4, so that only a relatively small volume of the container is occupied by the solution 14, as shown in FIG. 1, for example. As stated, the lithium chloride solution introduced into container 2 is dilute, that is, it is sufficiently diluted so that its vapor pressure is greater than the vapor pressure of the relatively dry air introduced through the inlet air duct 10.

As sunlight traverses the transparent cover 4, the heat thereof is trapped within container 2 and causes vaporization of water from the solution 14, thus rendering the solution more concentrated and lowering its vapor pressure as it flows from inlet 6 toward outlet 8 and the heat thus absorbed is essentially only the necessary heat of vaporization and the materials do not exhibit an appreciable rise in temperature but the vapor pressure of the air increases as it entrains the water vapor.

A suitable blower or pump 16 in the outlet duct 12 withdraws air and water vapor from the container 2 and directs the same to an inlet 18 of a second or collector-converter container 20, adjacent but spaced upwardly from the bottom thereof. As shown, the second container 20 is provided with a multiplicity of baffle plates 22 therein and the outlet conduit 8 from container 2 directs concentrated solution from container 2 to a header 24 in the upper part of container 20. The header 24 is provided with a multiplicity of downwardly directed nozzles 26 through which the concentrated solution from container 2 is sprayed to cascade downwardly over the baffle plates 22 and the air and water vapor introduced through inlet 18 rises upwardly in countercurrent scrubbing relation to the solution moving downwardly over the baffle plates. The air introduced at 18 contains a considerable amount of water vapor and its vapor pressure is thus quite high relative to that of the concentrated lithium chloride solution introduced into container 20. As is known, under these conditions, the concentrated solution will reabsorb water vapor in the form of water and the same is condensed therein, thus releasing the latent heat of vaporization, to effect a rise in the sensible temperature of the solution and this also effects a dilution of the lithium chloride solution. A heated dilute solution then gathers in the bottom of the container 20, as shown at 28. The dried air leaves the container 20 at outlet 30 and is recirculated to inlet 10 of the first container 2 for recycling. The heated dilute solution at 28 leaves the container 20 through its bottom outlet 32 and pump 34 causes flow thereof along conduit 36 to the inlet 38 of a heat exchanger designated generally at 40. The heat exchanger 40 may be any suitable type, for example, it may contain internal coils 42, preferably of the externally finned type, surrounded by a body of water at 44 in the heat exchanger tank, which water is in heat exchange relation to the coils 42. Water is circulated through the space 44 from an inlet 46 to an outlet 48. As is obvious, the water circulating through the space 44 will absorb heat from the heated solution in coils 42 and will thus extract the converted solar energy and may be directed through conduit 50 to any suitable place for storage or use. For example, the water could be circulated through the heating system of a residence but obviously could be used for any other heating purpose.

The cooled diluted solution leaves the heat exchanger 40 through outlet 52 which leads directly to the inlet conduit 6 previously described and, thus, the lithium chloride solution is continuously circulated as is the solvent water, and the body of air serving as a carrier gar for the water vapors.

The foregoing description suggests that the sun's heat entering collector container 2 is all used to provide the latent heat of vaporization for the solvent without appreciably raising the temperature of the solution at 14. However, some heating of the solution will take place, to a lesser degree if the inner surfaces of the side walls and bottom of the container 2 are heat reflective or transparent and to a greater degree if they are heat absorbing. In any event, such heat is recoverable in heat exchanger 40.

From the foregoing it will be obvious that applicant's objects are accomplished but it is to be understood that the description herein while limited to a single specific embodiment merely illustrates the principles of the invention and other forms of apparatus and other chemical materials may be employed within the scope of the appended claims.

I claim:

1. The method of collecting solar energy comprising the steps of:

placing a body of a relatively dilute solution of a salt in a first confined space and exposing the same to solar energy to vaporize solvent therefrom whereupon said solution becomes relatively concentrated;

passing a stream of relatively dry gas through said space and over said solution to entrain and carry off the vaporized solvent;

separately directing said vapor carrying gas and said concentrated solution to a second confined space and causing said concentrated solution to condense solvent from said gas and reabsorb the same whereupon the released latent heat of vaporization of said solvent raises the temperature of said solution; and thereafter extracting heat, as collected solar energy, from said heated solution.

2. The method of claim 1 wherein said solvent is water.

3. The method of claim 1 wherein said salt is lithium chloride.

4. The method of claim 1 wherein said gas is air.

5. The method of claim 1 wherein said concentrated solution is sprayed into said second space in countercurrent relation to flow of said gas therethrough and including the further steps of:

returning said dried gas to said first space to be recycled therethrough; and returning said solution, after extraction of heat therefrom, to said first space to be recycled therethrough whereby said method is continuous.

6. Apparatus for collecting solar energy comprising:

first container means for exposing a dilute salt solution to solar energy in the presence of a carrier gas to evaporate solvent from said solution into said gas;

means for directing said carrier gas and vaporized solvent, and for directing said concentrated solution, separately, from said first container to a second container;

means in said second container for causing said concentrated solution therein to condense and absorb said solvent vapors from said carrier gas and thereby heat and dilute said solution; and means for extracting heat from said heated dilute solution and conducting said heat away from said apparatus as collected solar energy.

7. Apparatus as defined in claim 6 wherein said last-named means is a heat exchanger having means for recycling said dilute solution therefrom to said first container.

8. Apparatus as defined in claim 7 including means for recycling said carrier gas from said second container to said first container.

* * * * *